April 25, 1939.  G. W. BILL  2,156,106
UNIVERSAL JOINT
Filed Sept. 21, 1937  2 Sheets-Sheet 1
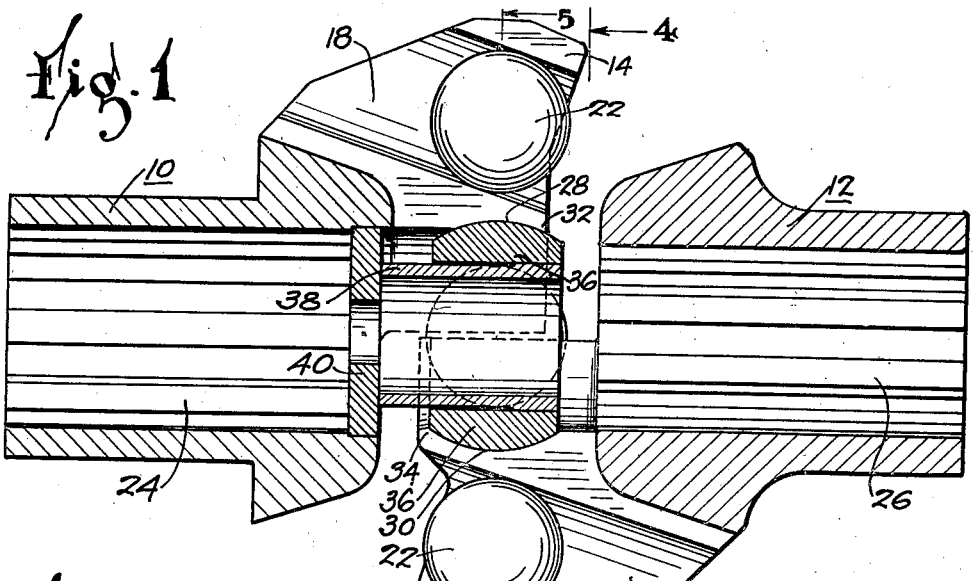
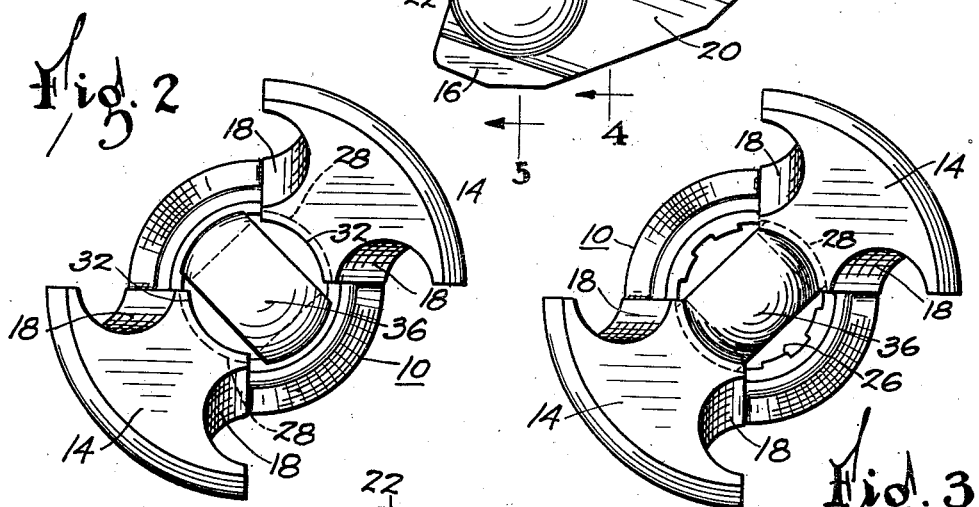
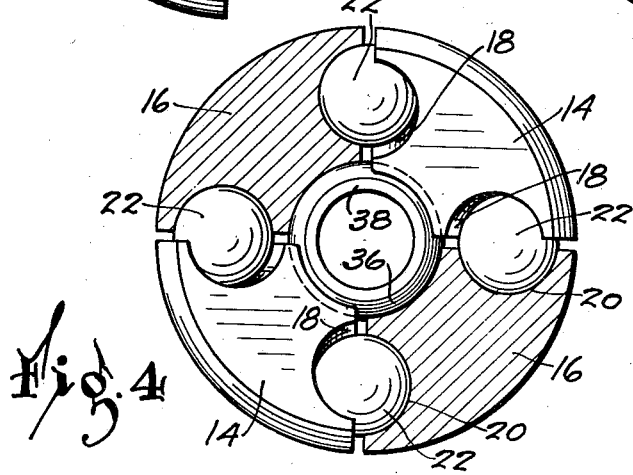
INVENTOR.
GEORGE W. BILL
BY A. E. Wilson.
ATTORNEY.

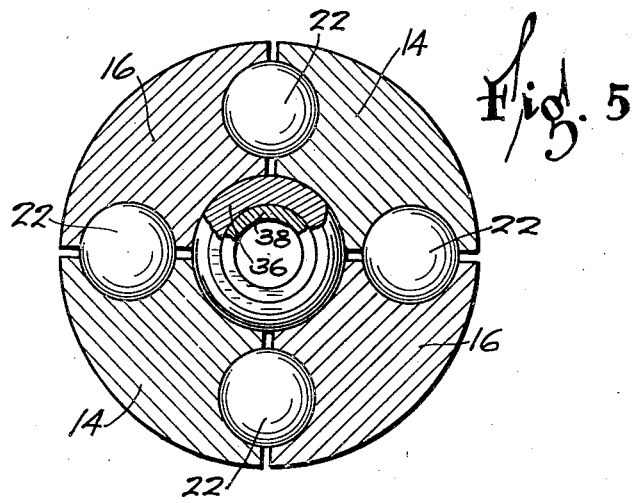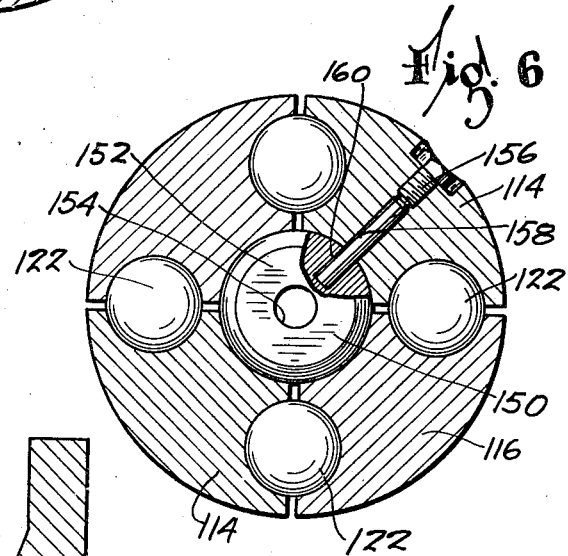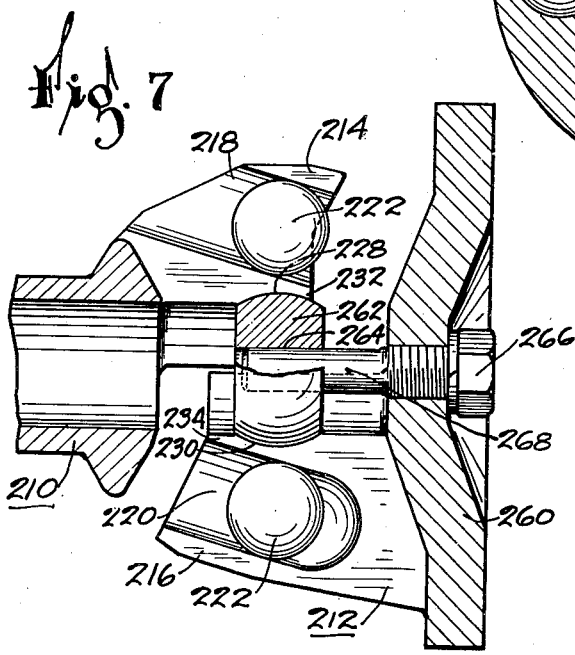

UNITED STATES PATENT OFFICE 2,156,106

UNIVERSAL JOINT

George W. Bill, South Bend, Ind., assignor to Bendix Products Corporation, South Bend, Ind., a corporation of Indiana Application September 21, 1937, Serial No. 164,946

14 Claims. (Cl. 64—9)

This invention relates to universal joints, and more particularly to novel means for maintaining universal joints in the assembled relation.

In constant angle velocity universal joints wherein torque is transmitted from one body member to another body member of the joint through torque transmitting means associated with the body members, it has in the past, been customary to form an auxiliary spherical shaped shell surrounding the body members of the joint to prevent the body members from becoming disassembled when the body members are moved longitudinally or angularly with reference to each other. In manufacturing such joints it was necessary that the outer surface of the body members be machined to rather close limits so that the spherical shell could be attached to one of the body members, and after the body members had been assembled, the spherical shell could be deformed to closely overlie the other body member to prevent undesirable movement between the body members. When this structure was employed, it was of course, impossible to disassemble the joint to inspect the parts without destroying the shell surrounding the body members. Unless the body members and the shell were held to close tolerances the deforming of the shell around one of the body members would either cause objectionable binding, cramping or friction of the parts or would result in objectionable longitudinal movement between the body members.

An object of this invention is to provide novel means interposed between the body members of the joint to prevent the joint from becoming disassembled.

A further object of the invention is to reduce the cost of manufacturing and assembling universal joints of the substantially constant angle velocity type.

Yet a further object of the invention is to provide a substantially constant angle velocity universal joint having enclosed means to lock the body members of the joint together in such a manner that the joint can transmit torque while subjected to either thrust or longitudinal pull.

A still further object of the invention resides in the provision of a generally spherical shaped member or washer interposed between the body members of the joint and adapted to be contacted by inwardly extending projections carried by the body members to hold the joint in the assembled relation, thereby eliminating the necessity of using the spherical shell formerly employed to hold the joint in the assembled relation.

Yet a further object of the invention resides in the provision of novel means whereby a joint may be held in the assembled position, yet which may be disassembled whenever desired without destroying any of the parts of the joint assembly.

Other desirable features and advantages of this invention will be apparent from a consideration of the following detailed description, considered in connection with the accompanying drawings submitted for purposes of illustration only and not intended to define the scope of the invention, reference being had for that purpose to the subjoined claims.

In the drawings wherein similar reference characters refer to similar parts throughout the several views:

Figure 1 is a vertical section through a universal joint embodying one desirable form of the present invention;

Figure 2 is an end elevation of one of the joint body members illustrated in Figure 1 showing the locking means in the starting position for assembly;

Figure 3 is a view similar to Figure 2 showing the locking means in partially assembled position with reference to one of the body members;

Figure 4 is a sectional view taken on the line 4—4 of Figure 1;

Figure 5 is a sectional view taken on the line 5—5 of Figure 1;

Figure 6 is a view similar to Figure 5 showing a modified form of the invention; and Figure 7 is a view similar in many respects to Figure 1 showing a still further modified form of the invention.

Referring more particularly to Figure 1 there is shown for purposes of illustrating this invention, a universal joint having cooperating body members 10 and 12, having cooperating arms 14 and 16 respectively. The arms 14 and 16 are provided with cooperating raceways 18 and 20 respectively adapted to receive torque transmitting balls 22 interposed therebetween to transmit torque from one of the body members to the other, and to roll in the raceways 18 and 20 to substantially bisect the angle between the shafts operably connected thereto in the splined portions 24 and 26 of the body members 10 and 12 respectively. The body members 10 and 12 are each provided with undercut spherical recesses 28 and 30 respectively formed by inwardly extending segments 32 and 34 respectively between the arms 14 and 16 of the body members 10 and 12 respectively. A segment of a ball 36 is interposed in the spherical recesses 28 and 30 of the body members 10 and 12 respectively, to engage the segments 32 and 34 of the body members 10 and 12 to prevent the body members from moving longitudinally or angularly with reference to each other to such an extent that the body members of the joint could become disassembled.

As will be observed the ball 36 is flattened on two sides, and is hollow. As more clearly illustrated in Figure 2, the ball 36 may be inserted between the segments 32 of the body member 10 and then turned to fit within the under-cut recesses 28 formed between the arms 14. When the ball 36 is moved to the position shown in Figure 3, the body member 12 may be assembled by passing the segments 34 over the flattened portion of the ball 36. The ball 36 may then be rotated 90° on an axis perpendicular to the hollow section thereof, whereupon the ball will lie within the recess 30 of the body member 12, and also within the recess 32 of the body member 10, thus effectively preventing any excessive longitudinal movement of the body members 10 and 12 which could cause disassembly of the joint.

Any desired means may be employed to prevent the ball 36 from moving with reference to one of the body members to prevent the joint from becoming disassembled. One desirable embodiment resides in inserting a sleeve 38 within the ball 36. The sleeve 38 is a press-fit within the ball and extends between the spaced arms 14 of the body member 10, and abuts against a washer 40 positioned in the inner extremity of the splined section 24, thus preventing the ball 36 from tilting in relation to body member 10. The sleeve 38 may be inserted through the hollow portion of the body member 12 after the joint has been completely assembled. If desired, a cup-shaped sleeve may be employed which may be bolted to the end of the shaft to which the body member 10 is attached.

Referring now to Figure 6, a modified form of locking the body members together is shown. In view of the similarity of the parts of this structure to those already described, corresponding parts have been given the same reference numerals with the addition of 100.

It will be observed that the central ball 150 has a recess 152 formed therein and is formed with a central aperture 154. The central ball 150 is introduced between the body members of the joint in the same manner as referred to above, and is then locked with reference to the arms 114 of the body member 110 by means of a bolt 156 having a projection 158 adapted to project into an aperture 160 in the side of the ball 150. When the joint is assembled with reference to the interconnected shafts, a bolt may be passed through the central aperture 154 of the ball 150 to lock the ball with reference to the arms 114 of the body member 110 and the shaft to which that body member is attached. The head of the bolt will of course lie in the recess 152 formed in the ball 150. If desired the bolt 156 may then be removed, since it merely holds the extension 158 into the ball 150 to prevent a tilting movement of the ball 150 relative to the body member 110, or it may be left in permanently.

The embodiment of the invention illustrated in Figure 7 is also similar in many respects to that illustrated in the other figures. Corresponding parts have therefore been given corresponding reference numerals with the addition of 200. It will be observed that the body member 212 is provided with a flanged section 260 by means of which that body member may be attached to a shaft. A ball 262 having a relatively small central aperture 264 and flattened sides is adapted to be interposed between the body members 210 and 212 as referred to above. A bolt 266 passing through the flange 260 is provided with a projection 268 adapted to project into the aperture 264 of the ball 262 to prevent the ball from tilting with reference to the body member 212, thereby preventing the joint from becoming disassembled. In each of these illustrative embodiments it will be noted that the central ball is merely prevented from tilting with reference to one of the body members. Any desired means may of course be employed to prevent the central ball from tilting. The central ball may or may not rotate coaxial in relation to the body member to which it is locked, since it is relatively unimportant whether any rotation thereof occurs. If desired the central ball may engage the inwardly extending projections of the body members rather loosely so that limited longitudinal movement of the body members may be permitted.

It will be understood that while this invention has been described with particular reference to a universal joint having straight races to receive the torque transmitting balls, it may be applied to universal joints embodying curved races if desired.

The body members of the joint may be formed in any desired manner, such for example, as forging, casting, or may be formed by a die-casting operation of the general type disclosed in the copending applications of John Floyd, Serial No. 65,068, filed February 21, 1936, and Ernest R. Koppel, Serial No. 65,256, filed February 24, 1936.

While the invention has been described with particular reference to several desirable embodiments thereof it is to be understood that the scope of the invention is not to be limited to the features illustrated and described, as many changes can be made therein without departing from the spirit of the invention as defined by the following claims.

I claim:

1. A universal joint having a pair of body members including transversely extending grooves, torque transmitting means between the body members, and locking means including a generally spherical member interposed between the body members and received within the transversely extending groove of each body member to hold the joint in the assembled relation.

2. In a universal joint of the constant angle velocity type, means comprising a pair of body members having cooperating arms including spaced cooperating raceways, torque transmitting means including balls positioned in the raceways, means including a centrally disposed partially spherical member having flattened sides interposed between the body members and engaging portions of said body members to prevent the body members from becoming disassembled, and means to prevent said partially spherical member from tilting with reference to one of said body members.

3. In a universal joint, a pair of body members having a plurality of spaced arms, driving means between the spaced arms, and locking means including a partially spherical hollow member adapted to engage portions of each body member to prevent said body members from becoming disassembled, and means received within the hollow spherical member to prevent said partially spherical member from tilting with reference to one of said body members.

4. In a constant angle velocity universal joint, a pair of body members including a plurality of spaced arms having cooperating raceways formed therein, torque transmitting means positioned in the raceways, means including a partially spherical member having a flat side positioned between the body members adapted to be moved to intermediate positions to permit the joint to be assembled and to be moved to another position to lock the body members in assembled relation.

5. In a universal joint, a pair of body members including a plurality of spaced arms having cooperating raceways, torque transmitting means positioned in the raceways, means including a hollow member positioned between the body members adapted to be moved to one position to permit the joint to be assembled and to another position to lock the joint in assembled relation, and means associated with one of the body members and engaging the hollow member to lock the last named means in the locked position.

6. In a universal joint, a pair of body members, torque transmitting means positioned between the body members, means including a partially spherical member having flattened side walls adapted to be received between the body members, and engage portions thereof to prevent the body members from becoming disassembled and means to prevent said partially spherical member from tilting with reference to one of said body members.

7. In a universal joint comprising a pair of body members including spaced arms having spherical recesses formed therebetween, torque transmitting means between the body members, and a spherical member having flattened side walls interposed between the body members and engaging in said spherical recesses to prevent the body members from becoming disassembled, and means to hold said partially spherical member in a substantially fixed position with reference to one of said body members.

8. In a universal joint comprising a pair of body members including spaced arms having spherical recesses formed therebetween, and a spherical member having flattened side walls interposed between the body members and engaging in said spherical recesses to prevent the body members from becoming disassembled.

9. In a universal joint adapted to transmit torque at substantially constant angular velocity while subjected to thrust or longitudinal pull, a pair of body members having spaced arms, and means including a hollow partially spherical member having flattened sides interposed between and engaged by each of the body members to hold the joint in the assembled relation.

10. In a universal joint adapted to transmit torque at substantially constant angular velocity while subjected to thrust or longitudinal pull, a pair of body members having spaced arms, means comprising a generally spherical hollow member having flattened sections designed to pass between the spaced arms of the body members and to be turned to lock the body members together, and means projecting into the hollow spherical member to hold the spherical member from turning to such a position that it would pass between the spaced arms of the body members.

11. In a universal joint of the constant angle velocity type, means comprising a pair of body members having cooperating arms including spaced cooperating raceways, means including a centrally disposed partially spherical member having flattened sides interposed between the body members and engaging portions of said body members to prevent the body members from becoming disassembled, and means extending through the arms of one of said body members to prevent said partially spherical member from tilting with reference to one of said body members.

12. In a universal joint of the constant angle velocity type, means comprising a pair of body members having cooperating arms including spaced cooperating raceways, a splined shaft engaging member carried by one of the body members, a flanged shaft engaging member carried by the other body member, means including a centrally disposed partially spherical member having flattened sides interposed between the body members and engaging portions of said body members to prevent the body members from becoming disassembled, and means extending through the flanged portion of said body member to prevent said partially spherical member from tilting with reference to one of said body members.

13. In a universal joint a pair of longitudinally extending body members having spaced arms provided with transversely extending generally spherical recesses, and means including a generally spherical member having flattened side walls adapted to pass between the spaced arms of the body members and to be moved to a position to seat in the transversely extending recesses in the body members to hold the body members together.

14. In a universal joint a pair of longitudinally extending body members having spaced arms provided with transversely extending generally spherical recesses, means including a hollow generally spherical member having flattened side walls adapted to pass between the spaced arms of the body members and to be moved to a position to seat in the transversely extending recesses in the body members to hold the body members together, and means projecting through one of the body members and partially received within the hollow spherical member to hold said member in a fixed position with reference to one of the body members.

GEORGE W. BILL.